United States Patent [19]

Kühlthau

[11] 3,873,528

[45] Mar. 25, 1975

[54] INDOLINE DYESTUFFS
[75] Inventor: Hans-Peter Kühlthau, Leverkusen, Germany
[73] Assignee: Bayer Aktiengesellschaft, Leverkusen, Germany
[22] Filed: Mar. 9, 1973
[21] Appl. No.: 339,828

[30] Foreign Application Priority Data
Mar. 11, 1972 Germany.............................. 2211959

[52] U.S. Cl.................... 260/240 J, 8/54.2, 8/62, 8/63, 8/178 E, 8/178 R, 8/179, 260/316.11 R, 260/346.2 M
[51] Int. Cl. ...................... C07d 27/36, C09b 23/00
[58] Field of Search ................. 260/326.11 R, 240.5

[56] References Cited
UNITED STATES PATENTS
3,468,619  9/1969  Raue et al................................. 8/25

OTHER PUBLICATIONS
Coenen et al., Zeitschrift fur Elektochemie, Vol. 57, pages 785 to 795 (1953).

The Ring Index, Supplement II, page 317 and frontispage (1964).

Primary Examiner—John D. Randolph
Attorney, Agent, or Firm—Plumley & Tyner

[57] ABSTRACT
Indoline dyestuffs of the formula

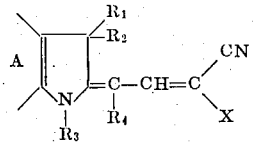

wherein $R_1$ and $R_2$ independently of one another denote alkyl, cycloalkyl or aralkyl or conjointly form a cycloalkyl ring, $R_3$ denotes hydrogen, alkyl, cycloalkyl, aryl or aralkyl, $R_4$ denotes hydrogen, alkyl, nitrile, carbamoyl, N-alkylcarbamoyl, alkoxycarbonyl or aralakoxycarbonyl, A represents the remaining members of a dibenzofurane radical which is optionally substituted further, and X represents a nitrile, carboxylic acid ester or carboxylic acid amide group are suitable for dyeing and printing synthetic fibre materials.

10 Claims, No Drawings

INDOLINE DYESTUFFS

The subject of the present invention are indoline dyestuffs of the formula

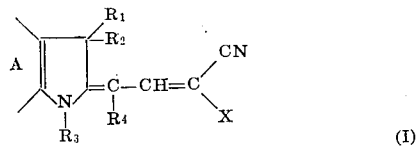

(I)

in which
R$_1$ and R$_2$ independently of one another denote alkyl, cycloalkyl or aralkyl or conjointly form a cycloalkyl ring,
R$_3$ denotes hydrogen, alkyl, cycloalkyl, aryl or aralkyl,
R$_4$ denotes hydrogen, alkyl, nitrile, carbamoyl, N-alkylcarbamoyl, alkoxycarbonyl or aralkoxycarbonyl,
A represents the remaining members of a dibenzofurane radical which is optionally substituted further, and X represents a nitrile, carboxylic acid ester or carboxylic acid amide group,
as well as processes for their manufacture and their use.

Suitable alkyl radicals R$_1$ and R$_2$ are, in particular, methyl and ethyl radicals.

A suitable isolated cycloalkyl radical R$_1$ and R$_2$ is the cyclohexyl radical.

Suitable cycloalkyl radicals which can be formed by R$_1$ and R$_2$ conjointly are cyclohexyl and cyclopentyl radicals.

Suitable aralkyl radicals R$_1$, R$_2$ and R$_3$ are phenylalkyl radicals which preferably have 1 to 4 C atoms in the alkyl group and are optionally substituted in the phenyl radical by halogen, C$_1$-C$_4$-alkyl or C$_1$-C$_4$-alkoxy; as examples there may be mentioned benzyl, p-chlorobenzyl, phenylethyl or phenylpropyl-(2,2).

Suitable aryl radicals R$_3$ are naphthyl and above all phenyl radicals which can be substituted by, for example, halogen, C$_1$-C$_4$-alkyl or C$_1$-C$_4$-alkoxy; as examples there may be mentioned: 4-tolyl, 2-chlorophenyl, 4-bromophenyl, 2-methyl-4-fluorophenyl and others.

Suitable alkyl radicals R$_3$ and R$_4$ are saturated or unsaturated alkyl groups with 1 - 6 atoms which can optionally be substituted further, for example by hydroxyl, halogen, nitrile, C$_1$-C$_4$-alkoxy, CONH$_2$, C$_1$-C$_4$-alkoxycarbonyl or C$_1$-C$_4$-alkylcarbonyloxy.

As examples there may be mentioned: methyl, ethyl, chloroethyl and bromoethyl, hydroxyethyl, cyanoethyl, methoxypropyl, acetoxyethyl, allyl, n- and i-propyl and n-, i- or t-butyl.

Suitable alkoxycarbonyl groups and N-alkylcarbamoyl groups R$_4$ are those with 1 – 4 C atoms in the alkyl or alkoxy radical.

Suitable aralkoxycarbonyl groups R$_4$ are phenyl-(C$_1$-C$_4$)-alkoxycarbonyl groups.

The dibenzofurane radical A can also be substituted, for example by chlorine, bromine, fluorine, C$_1$-C$_4$-alkyl, benzyl, C$_1$-C$_4$-alkoxy, nitro, hydroxyl, nitrile, CF$_3$, C$_1$-C$_4$-alkylcarbonyl, C$_1$-C$_4$-alkoxycarbonyl, carbamoyl, N-C$_1$-C$_4$-alkoxycarbamoyl, C$_1$-C$_4$-alkylcarbonylamino, benzoylamino, toloylamino, sulphamoyl, N—C$_1$-C$_4$-alkylsulphamoyl, N,N—C$_2$-C$_8$-dialkylsulphamoyl, N,N-C$_2$-C$_8$-dialkylsulphamoyl, C$_1$-C$_4$-alkylsulphonyl, phenylsulphonyl, tolylsulphonyl, phenoxy, tolyloxy and benzyloxy. In addition, the benzene ring of the dibenzofurane radical A which is not bonded to the pyrrole ring can possess a fused benzene ring.

By carboxylic acid ester groups X there are to be understood radicals which correspond to the formula -CO$_2$Q, wherein
Q denotes alkyl, cycloalkyl, aralkyl or hetoryalkyl.

By carboxylic acid amide groups X there are to be understood radicals which correspond to the formula —CONV$_1$V$_2$, wherein
V$_1$ and V$_2$ represent hydrogen, alkyl, cycloalkyl or aralkyl
as well as those wherein
V$_1$ and V$_2$ conjointly with a N-atom form a heterocyclic structure.

Suitable alkyl radicals Q, V$_1$ and V$_2$ are above all saturated and unsaturated alkyl radicals with 1 - 6 C atoms which can carry further substituents such as, for example, hydroxyl, C$_1$-C$_4$-alkoxy, phenoxy or nitrile.

Suitable cycloalkyl radicals, Q, V$_1$ and V$_2$ are those with 5 – 7 C atoms, such as cyclohexyl, methylcyclohexyl and cyclopentyl.

Suitable aralkyl radicals Q, V$_1$ and V$_2$ are phenylalkyl and phenylalkenyl radicals which can be substituted in the benzene ring, for example by NO$_2$, Cl, F, Br, OCH$_3$ or CH$_3$, and which possess 1 - 4 C atoms in the alkyl or alkenyl chain.

Suitable hetoryalkyl radicals Q are, for example, furfuryl-(furylmethyl) or thenyl-(thienylmethyl) radicals.

Examples of heterocyclic compounds which are formed by V$_1$ and V$_2$ conjointly with the N atom of the amide group are: morpholine-, piperidine-, N-methylpiperazine, thiomorpholine and thiomorpholine dioxide.

Within the compass of the formula (I), dyestuffs to be regarded as particularly preferred are those which correspond to the formulae

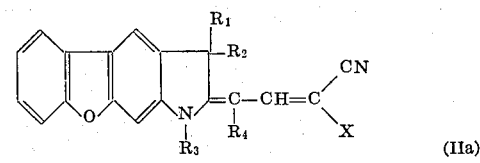

(IIa)

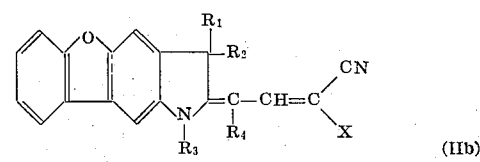

(IIb)

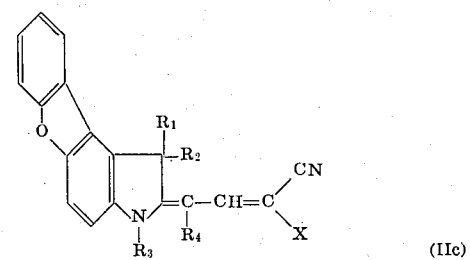

(IIc)

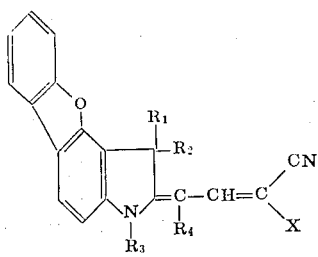

(IId)

wherein
$R_1 - R_4$ and X have the abovementioned meaning and the dibenzofurane radicals can carry further substituents, preferably Cl, Br, $NO_2$ and $CH_3$.

Particularly preferred dyestuffs are those of the formulae (IIa) to (IId)
in which
$R_1$ and $R_2$ denote methyl,
$R_3$ denotes methyl, ethyl, n-propyl, i-propyl, n-butyl, β-chloroethyl, β-hydroxyethyl, β-cyanoethyl, β-methoxyethyl, β-bromoethyl, β-acetoxyethyl or benzyl,
$R_4$ denotes hydrogen or nitrile and
X represents nitrile, optionally methoxy- substituted $C_1-C_4$-alkoxycarbonyl, $C_5-C_7$-cycloalkoxycarbonyl or optionally methyl-, nitro-, methoxy- or chlorine-substituted phenyl-$C_1-C_4$-alkoxycarbonyl or phenoxy-$C_1-C_4$-alkoxycarbonyl.

The new dyestuffs of the formula (I) are obtained by condensing aldehydes of the formula

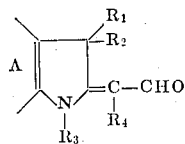

(III)

or their functional derivatives, wherein
A and $R_1 - R_4$ have the abovementioned meaning with compounds of the formula

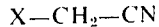

$X-CH_2-CN$ (IV)

wherein
X has the abovementioned meaning.

The condensation is carried out in the presence or absence of a solvent or diluent, preferably with the addition of an alkaline catalyst, at elevated temperature, preferably in the range of 60° – 120°C.

Suitable solvents or diluents are those which are inert under the conditions of the condensation and are able sufficiently to dissolve the reactants, and from which the reaction products separate out well. For example, methanol, ethanol, 2-methoxyethanol, isopropanol, dioxane, benzene, toluene, chlorobenzene, chloroform and pyridine are used.

As examples of alkaline catalysts, sodium hydroxide, potassium carbonate, sodium acetate and preferably secondary organic bases such as diethylamine and especially pyrrolidine or piperidine should be mentioned.

The reactants can be employed in molar ratio but an approximately 5 percent excess of the cyanoacetic acid ester component (3) is advantageous. It is also possible to choose a larger excess of cyanoacetic acid ester without thereby adversely influencing the course of the reaction.

Mixtures of aldehydes (III), such as are obtained during their manufacture, described later, are also very suitable as starting materials for the preparation, according to the invention, of the new dyestuffs (I).

Examples of suitable aldehydes of the formula (III) are:

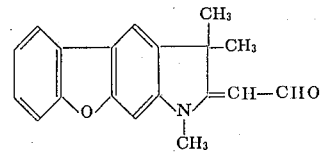

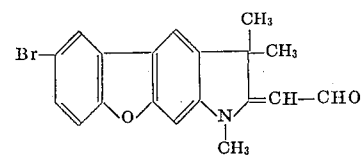

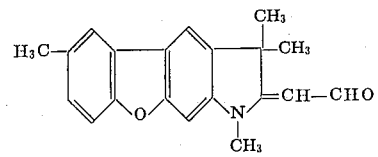

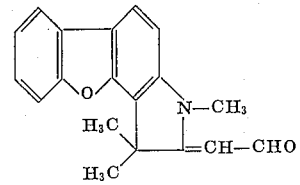

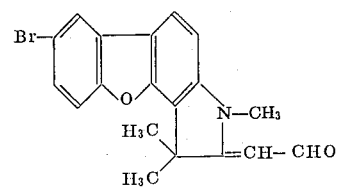

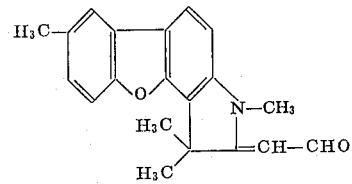

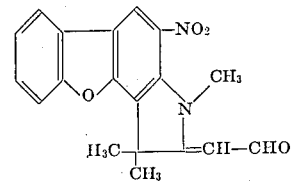

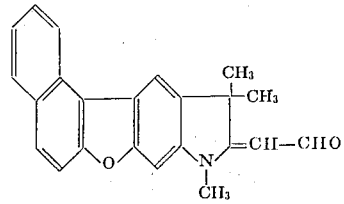

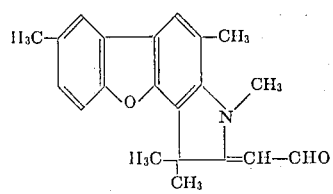
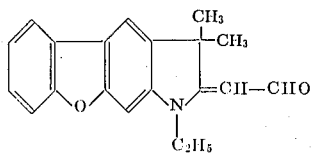
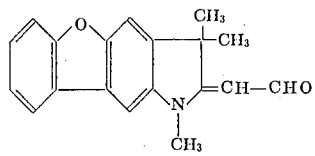
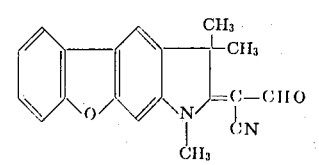
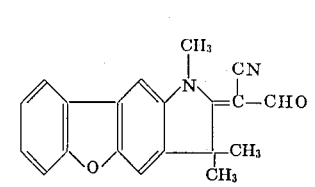
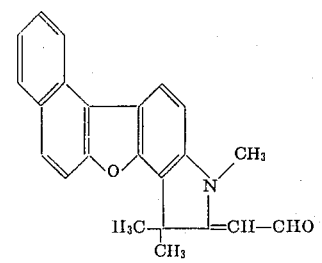
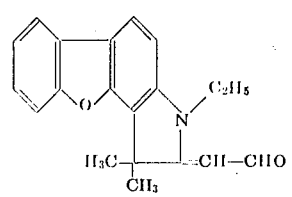
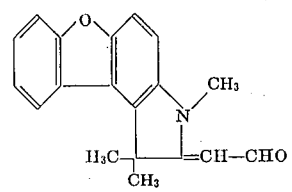
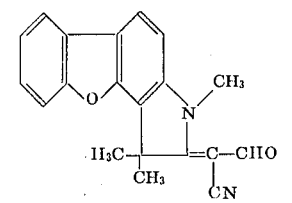

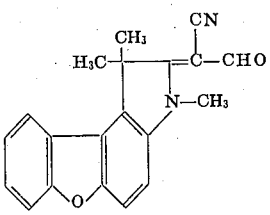
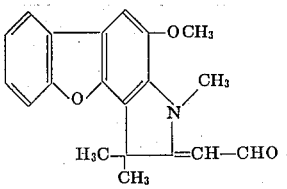
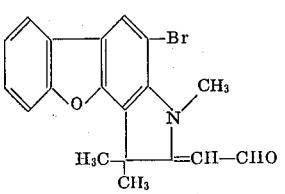

Examples of suitable cyanoacetic acid derivatives of the formula IV are malodinitrile, cyanoacetic acid methyl ester, cyanoacetic acid ethyl ester, cyanoacetic acid isobutyl ester, cyanoacetic acid 3-methoxybutyl ester, cyanoacetic acid isoamyl ester, cyanoacetic acid cyclohexyl ester, cyanoacetic acid p-methylcyclohexyl ester, cyanoacetic acid tetrahydrofurfuryl ester, cyanoacetic acid methyl ester, cyanoacetic acid dichloroisopropyl ester, cyanoacetic acid benzyl ester, cyanoacetic acid 2-chlorobenzyl ester, cyanoacetic acid 4-chlorobenzyl ester, cyanoacetic acid 3,4-dichlorobenzyl ester, cyanoacetic acid 2,4,6-trichlorobenzyl ester, cyanoacetic acid 4-nitrobenzyl ester, cyanoacetic acid-methylbenzyl ester, cyanoacetic acid ester, acid β-phenylethyl ester, cyanoacetic acid β-hydroxy-β-phenylethyl ester, cyanoacetic acid γ-phenylpropyl ester, cyanoacetic acid γ-phenylallyl ester, cyanoacetic acid phenoxyethyl ester, cyanoacetic acid N-methylamide, cyanoacetic acid N-ethylamide, cyanoacetic acid N-butylamide, cyanoacetamide, cyanoacetic acid N-methylanilide, cyanoacetic acid N-ethylanilide, cyanoacetic acid β-hydroxyethylamide, cyanoacetic acid methoxypropylamide, cyanoacetic acid β-methoxyethyl ester, cyanoacetic acid β-chloroethyl ester, cyanoacetic acid β-cyanoethyl ester, cyanoacetic acid β-hydroxyethyl ester, cyanoacetic acid n-propyl ester, cyanoacetic acid isopropyl ester, cyanoacetic acid allyl ester, cyanoacetic acid n-butyl ester, cyanoacetic acid p-methyoxybenzyl ester or mixtures of these cyanoacetic acid derivatives.

The new azolindoline dyestuffs of the formula (I) and (II), especially the mixtures of these dyestuffs - for example mixtures of (IIa) and (IId) as well as (IIb) and (IIc) - are outstandingly suitable for dyeing and printing synthetic fibre materials and woven fabric materials of aromatic polyesters and cellulose esters, but preferably of synthetic polyamides and polyurethanes.

Using these dyestuffs, extraordinarily brilliant dyeings in yellow shades are produced on the fibres and woven fabrics mentioned, the dyeings being distinguished by particularly high colour strength, very good build-up capacity and affinity and outstanding fastness properties, such as fastness to washing, to rubber, to sublimation, to perspiration, to gas fume fading and to light.

The new dyestuffs of the formula (I) can be used for dyeing and printing in accordance with customary processes, for example in the form of aqueous dispersions or printing pastes. The dye baths and printing pastes can contain the customary dyeing auxiliary additives such as levelling agents, dispersiong agents and dyeing accelerators. In addition, the new dyestuffs can also be added to the spinning compositions prior to spinning in the case of the manufacture of synthetic fibres.

Some types of the new dyestuffs can also be used advantageously for dyeing from organic solutions, for example from solutions in which water-immiscible solvents such as tetrachloroethylene, trichloroethylene, 1,1,2-trichloroethane or 1,1,1-trichloropropane are used.

A further subject of the present invention are indolines of the formula

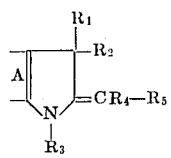

(1)

in which
R₁ and R₂ independently of one another denote alkyl, cycloalkyl or aralkyl or conjointly form a cycloalkyl ring,
R₃ denotes hydrogen, alkyl, cycloalkyl, aryl or aralkyl, R₄ denotes hydrogen, alkyl, nitrile, carbdmoyl, N-alkylcarbamoyl, alkoxycarbonyl or aralkoxycarbonyl,
R₅ denotes hydrogen or an optionally modified aldehyde group and
A represents the remaining members of a dibenzofurane radical which is optionally substituted further,
as well as processes for their manufacture.

The radicals R₁ - R₄ and A have already been defined in more detail above.

By modified aldehyde groups R₅ there are especially to be understood acetals, hydrates, oximes, ammoniates, aminals, bisulphite adducts and hydrazones.

Within the compass of the formula (1), compounds to be regarded as preferred are those which correspond to the formulae (2a) - (2d)

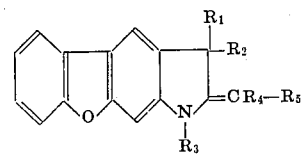

(2a)

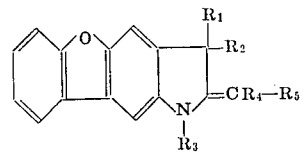

(2b)

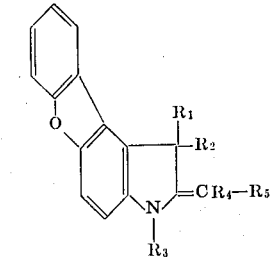

(2c)

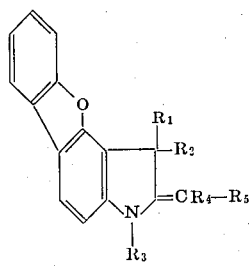

(2d)

in which
R₁ - R₅ have the abovementioned meaning and the dibenzofurane radicals can carry further substituents, preferably chlorine and bromine atoms as well as methyl, methoxy and nitro groups.

Particularly preferred compounds (2a) - (2d) are those in which
R₁ and R₂ denote methyl,
R₃ denotes methyl, ethyl, n-propyl, i-propyl, n-butyl, β-chloroethyl, β-hydroxyethyl, β-cyanoethyl, β-methoxyethyl, β-bromoethyl, β-acetoxyethyl or benzyl,
R₄ denotes hydrogen,
R₅ denotes hydrogen or -CHO and the dibenzofurane radicals do not carry any further substituents.

The new indolines of the formula (1) are obtained if indolenines of the formula

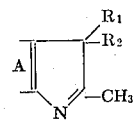

(3)

in which
R₁, R₂ and A have the abovementioned meaning are first reacted with N alkylating or N aralkylating agents R₃Y to give compounds of the formula

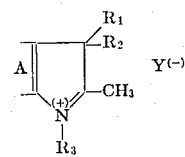

(4)

wherein
A, R₁, R₂ and R₃ have the abovementioned meaning and
Y represents the anionic radical originating from the alkylating or aralkylating agent
these are converted in a manner which is in itself known, under alkaline conditions, into the indolines of the formula

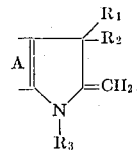

(5)

in which
A, R₁, R₂ and R₃ have the abovementioned meaning and - if desired - the substituent R₄ is introduced into these in accordance with C alkylating methods which are in themselves known and/or the aldehyde group R₅ is introduced into these in accordance with formylating methods which are in themselves known and - optionally - this aldehyde group is converted into a functional derivative thereof.

In carrying out the quaternisation of the indolenines (3), an appropriate procedure is to react approximately equimolar amounts of the reactants with one another in a solvent which is inert under the reaction conditions, such as benzene, toluene, chlorobenzene, o-dichlorobenzene, chloroform, carbon tetrachloride, dioxane, ethyl acetate or acetonitrile, at temperatures between 25° and 130°C.

Suitable alkylating agents and aralkylating agents for converting compounds of the formula (3) into the formula (4) are, for example, alkyl halides such as methyl iodide, ethyl bromide, n-propyl bromide, i-propyl chloride, allyl bromide, N-butyl bromide, isoamyl chloride, sulphuric acid esters of lower alkanols such as dimethyl sulphate or diethyl sulphate, aromatic sulphonic acid esters such as p-toluenesulphonic acid methyl ester and ethyl ester, m-chlorobenzenesulphonic acid ethyl ester and substituted alkyl halides such as β-chloropropionitrile, 4-hydroxybutyl bromide, phenylethyl bromide, benzyl chloride, p-chlorobenzyl chloride, p-methoxybenzyl chloride, p-cyanobenzyl chloride, phenylacyl chloride, β-chloroacetic acid methyl ester, β-chloropropionic acid methyl ester, β-bromopropionic acid dimethylamide as well as acrylonitrile, ethylene oxide and others.

Dimethyl sulphate and diethyl sulphate are particularly preferred. The liberation of the indolinemethylene bases of the formula (5) from the corresponding salts of the formula (4) is achieved in a manner which is in itself known by dissolving the salts of the formula (4), for example in water, and precipitating the methylene base by adding aqueous alkali such as sodium hydroxide solution or potassium hydroxide solution.

The methyleneindolines of the formula (5) can be converted in accordance with formylation methods which are in themselves known into the indoline-ω-aldehydes according to the invention, of the formula (1), wherein $R_5$ = CHO. This reaction can be carried out particularly simply and smoothly if the formylation is carried out in accordance with the Vilsmeier method. Suitable Vilsmeier formylation mixtures are obtained, for example, if phosphorus oxychloride, phosgene or thionyl chloride are reacted with tertiary formamides such as dimethylformamide or N-formyl-N-methylaniline; a mixture of equimolar amounts of phosphorus oxychloride and dimethylformamide is preferred. As solvents and diluents it is possible to use, for example, excess dimethylformamide or acetonitrile. The reaction temperatures can be varied over a substantial range without significantly changing the result. The reaction is advantageously carried out at between 30° and 85°C and preferably at 35° – 60°C.

The conversion of the free aldehyde group $R_5$ into a functional derivative thereof can also be carried out in accordance with methods which are in themselves known (compare, for example, "Houben-Weyl"; Volume VII/1 (4th edition) page 413–488).

The introduction of the substituent $R_4$ can be effected in a manner which is in itself known by treating the indoline compounds (5) with customary C alkylating agents such as, for example, cyanogen bromide, isocyanates, chloroformic acid esters, acrylonitrile, acrylic acid esters or acrylic acid amides.

The indolenines (3) which are required as a starting material for the manufacture of the new indolines (1) and which have hitherto not been described are obtainable in accordance with various methods. One of these processes is characterised in that dibenzofuranehydrazines of the formula

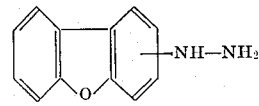

(6)

in which the benzene nuclei can carry further substituents, are reacted with ketones of the formula

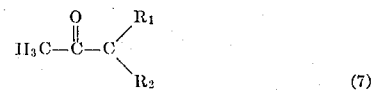

(7)

in which $R_1$ and $R_2$ have the abovementioned meaning in the presence of agents which split off water, such as zinc chloride, in a manner which is in itself known (Indole synthesis according to E. Fischer).

The hydrazines of the formula (6) are in part new and are obtainable, for example, by reduction of corresponding diazonium compounds.

A further process for the manufacture of the indolenines (3) consists of cyclising phenoxyindolenines of the formula

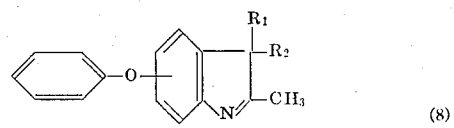

(8)

or hydroxyphenylindolenines of the formula

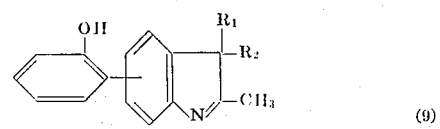

(9)

in which $R_1$ and $R_2$ have the abovementioned meaning and the benzene rings can carry further substituents, in a manner which is in itself known (compare, for example, Elderfield; ("Heterocyclic Compounds," Vol. 2, page 124) with formation of the dibenzofurane ring system.

In both the methods mentioned for the preparation of the indolenines (3) isomer mixtures of these compounds are obtained, which can be separated in accordance with customary processes (for example by fractional recrystallisation). In general it is however advisable to dispense with these separation operations since the mixtures of indolenines (3) which arise during their preparation, or the mixtures of indolines (1) prepared therefrom, are outstandingly suitable for the synthesis of dyestuff mixtures which have the advantage of better affinity over the corresponding pure dyestuffs.

EXAMPLE 1

29.1 g of an aldehyde mixture of the formula

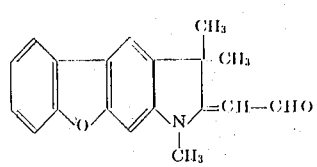

and

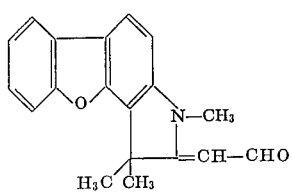

are heated to the boil with 11.4 g of cyanoacetic acid ethyl ester in 65 ml of ethanol, 0.5 ml of piperidine is added and the whole is kept at 80° for 3 hours. The mixture is cooled and the dyestuff mixture which has crystallised out is filtered off, washed with alcohol and dried. The interpretation of the NMR spectrum of this mixture shows a 57 percent content of the angularly arranged component

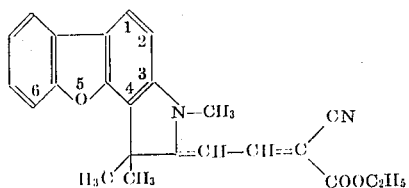

(a characteristic doublet at 6.87 ppm (for $C_2$) and a superposed doublet at approx. 7.85 ppm (for $C_1$), with a coupling constant of 8.3 Hz) and 43 percent of the linearly arranged component

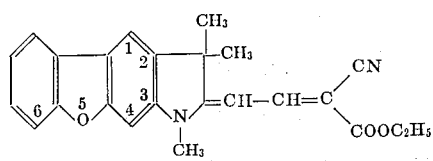

(two characteristic singlets at 7.73 ppm and 6.98 ppm, which are attributable to the two protons on $C_1$ and $C_4$).

The aldehyde mixture used as the starting material was manufactured as follows: 183 g of 3-aminodiobenzofurane are diazotised and then reduced in the customary manner to the corresponding hydrazine. If this is reacted, in a known manner (G. Plancher, B. 31, page 1496) with 95 g of methyl isopropyl ketone to give the trimethylindolenine, 190 g of a yellow oil are obtained which is not purified further but taken up immediately in 300 ml of chlorobenzene, stirred with 562 ml of 50 percent strength sodium hydroxide solution at room temperature under nitrogen and then treated dropwise with 200 g of dimethyl sulphate over the course of 4 hours with vigorous stirring at 25°.

The mixture is stirred for a further 2 hours, 1,500 ml of water are added, the whole is heated to 90° and the organic phase is separated off and washed with water. The trimethyl-2-methylene-indoline mixture thus obtained is then freed of the chlorobenzene under a waterpump vacuum.

Yield: 193 g of a yellow oil which crystallises slowly.

129 g of this mixture, the components of which possess the formulae

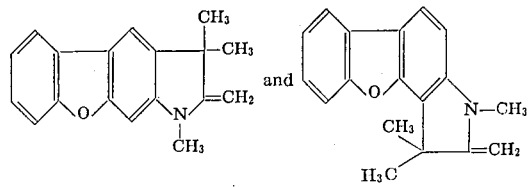

are slowly added, at 40°, to a mixture of 94.6 g of phosphorus oxychloride and 49 g of dimethylformamide. The resulting suspension is mixed for 8 hours at 45° and is then stirred into a mixture of 34.3 g of 45 percent strength sodium hydroxide solution and 1 kg of ice.

The mixture is stirred for a further 4 hours and the resulting crystalline aldehyde mixture is filtered off. Yield: 125.6 g.

The components of this mixture have the formulae:

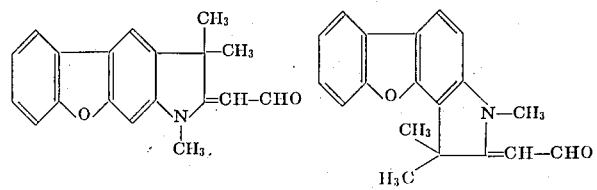

EXAMPLE 2

20 parts by weight of the dyestuff mixture obtained according to Example 1 are kneaded with 80 parts by weight of the condensation product of formaldehyde and naphthalenesulphonic acid and with a little water until the dyestuff is in a finely divided form. The paste is dried in vacuo.

A yarn of polymeric ε-caprolactam is introduced at 50° into a dye bath which per litre contains 0.66 g of the dyestuff dispersion manufactured in the manner described above and 0.5 g of a condensation product of formaldehyde and naphthalenesulphonic acid. The liquor ratio is 1 : 35. The bath is warmed to 100° over the course of half an hour and dyeing is carried out at this temperature for one hour. Thereafter the yarn is rinsed and dried. A very strong greenish-tinged yellow colouration of very good brilliance and very good fastness properties is obtained.

EXAMPLE 3

If the procedure of Example 1 is followed and instead of cyanoacetic acid ethyl ester a sufficient amount of cyanoacetic acid benzyl ester is employed, a mixture of the dyestuffs

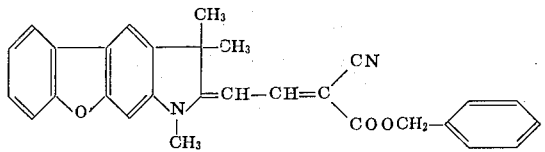

and

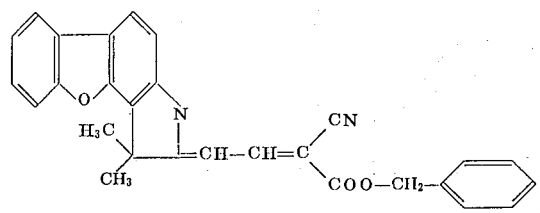

is obtained.

The mixture dyes polyamide fabric in a strongly greenish-tinged yellow of high brilliance, very good fastness to light and outstanding wet fastness properties. The following dye-stuff mixtures are obtained analogously using the corresponding starting materials:

TABLE 1

Dyestuff mixtures of the formulae

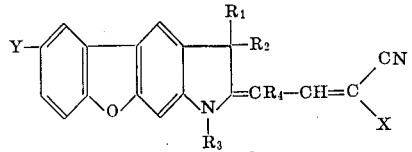  5  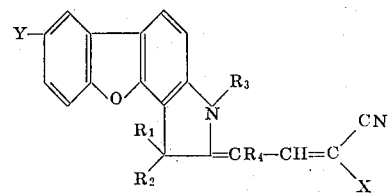

| Ex. | R₁ | R₂ | R₃ | Y | R₄ | X | Colour shade on polyamide |
|---|---|---|---|---|---|---|---|
| 4 | CH₃ | CH₃ | CH₃ | H | H | —COOCH₃ | Strongly greenish-tinged yellow. |
| 5 | CH₃ | CH₃ | CH₃ | H | CN | —COOC₂H₅ | Do. |
| 6 | CH₃ | CH₃ | CH₃ | H | H | —CN | Do. |
| 7 | CH₃ | CH₃ | C₂H₅ | H | H | —COOC₂H₅ | Do. |
| 8 | CH₃ | CH₃ | CH₃ | H | H | —COOC₄H₉ (i) | Do. |
| 9 | CH₃ | CH₃ | CH₃ | H | H | —COOC₄H₉ (n) | Do. |
| 10 | CH₃ | CH₃ | CH₃ | H | H | —COOC₅H₁₁ (i) | Do. |
| 11 | CH₃ | CH₃ | CH₃ | H | H | —COOC₃H₇ (i) | Do. |
| 12 | CH₃ | CH₃ | CH₃ | H | H | —COOC₃H₇ (n) | Do. |
| 13 | CH₃ | CH₃ | CH₃ | H | H | —COO—CH₂—CH₂—C₆H₅ | Do. |
| 14 | CH₃ | CH₃ | CH₃ | H | H | —COO—CH₂—CH₂—O—C₆H₅ | Do. |
| 15 | CH₃ | CH₃ | CH₃ | H | H | —COO—CH₂—CH₂—CH₂—C₆H₅ | Do. |
| 16 | CH₃ | CH₃ | CH₃ | H | H | —COO—C₆H₁₁ | Do. |
| 17 | CH₃ | CH₃ | CH₃ | H | H | —COO—CH₂—CH=CH₂ | Do. |
| 18 | CH₃ | CH₃ | CH₃ | H | H | —COO—CH₂—(2-Cl-C₆H₄) | Do. |
| 19 | CH₃ | CH₃ | CH₃ | H | H | —COO—CH₂—(4-CH₃-C₆H₄) | Do. |
| 20 | CH₃ | CH₃ | CH₃ | H | H | —COO—CH₂—(4-Cl-C₆H₄) | Do. |
| 21 | CH₃ | CH₃ | CH₃ | H | H | —COO—(2-isopropyl-5-methyl-C₆H₉) | Do. |
| 22 | CH₃ | CH₃ | CH₃ | H | H | —COO—CH₂—(3,4-Cl₂-C₆H₃) | Do. |
| 23 | CH₃ | CH₃ | CH₃ | H | H | —COO—CH(CH₃)—C₆H₅ | Do. |
| 24 | CH₃ | CH₃ | CH₃ | H | H | —COO—CH₂—CH=CH—C₆H₅ | Do. |
| 25 | CH₃ | CH₃ | CH₃ | H | H | —COO—CH₂—CH₂—OH | Do. |
| 26 | CH₃ | CH₃ | CH₃ | H | H | —COO—CH₂—CH₂—CN | Do. |
| 27 | CH₃ | CH₃ | CH₃ | H | H | —COO—CH₂—CH₂Cl | Do. |
| 28 | CH₃ | CH₃ | CH₃ | H | H | —COO—CH₂—CH₂—OCH₃ | Do. |
| 29 | CH₃ | CH₃ | CH₃ | H | H | —COO—CH(CH₂Cl)₂ | Do. |
| 30 | CH₃ | CH₃ | CH₃ | H | H | —COO—(4-CH₃-C₆H₁₀) | Do. |
| 31 | CH₃ | CH₃ | CH₃ | H | H | —COO—CH₂—CH₂—(tetrahydrofuryl) | Do. |

—Continued

| Ex. | R₁ | R₂ | R₃ | Y | R₄ | X | Colour shade on polyamide |
|---|---|---|---|---|---|---|---|
| 32 | CH₃ | CH₃ | CH₃ | H | H | —CO—NH—⟨H⟩ | Do. |
| 33 | CH₃ | —CH₃ | CH₃ | Br | H | —COOC₂H₅ | Do. |
| 34 | CH₃ | —CH₃ | CH₃ | CH₃ | H | —COOC₂H₅ | Do. |
| 35 | C₂H₅ | C₂H₅ | —CH₃ | H | H | —COOC₂H₅ | Do. |
| 36 | —CH₂—CH₂—CH₂—CH₂—CH₂— | | —CH₃ | H | H | —COOC₂H₅ | Do. |
| 37 | CH₃ | CH₃ | —CH₂—⟨⟩ | H | H | —COOC₂H₅ | Do. |
| 38 | CH₃ | CH₃ | —CH₂—CH₂—CN | H | H | —COOC₂H₅ | Do. |
| 39 | CH₃ | CH₃ | —CH₂—CH₂—OH | H | H | —COOC₂H₅ | Do. |
| 40 | CH₃ | CH₃ | —CH₂—CH₂—Cl | H | H | —COOC₂H₅ | Do. |
| 41 | CH₃ | CH₃ | CH₃ | H | CN | —CH₂—⟨⟩ | Do. |
| 42 | CH₃ | CH₃ | CH₃ | H | CN | —COOCH₃ | Do. |
| 43 | CH₃ | CH₃ | CH₃ | H | CN | —COO—C(CH₃)₂—CH₃ | Do. |
| 44 | CH₃ | CH₃ | —C₃H₇ | H | H | —COOC₂H₅ | Greenish-tinged yellow. |
| 45 | CH₃ | CH₃ | —CH₂—CH=CH₂ | H | H | —COOC₂H₅ | Do. |
| 46 | CH₃ | CH₃ | —CH₂—CH(OH)—CH₂—CH₃ | H | H | —COOC₂H₅ | Do. |
| 47 | CH₃ | CH₃ | —CH₂—CH₂—CH₂—CH₃ | H | H | —COOC₂H₅ | Do. |

EXAMPLE 48

3.2 g of the aldehyde of the formula

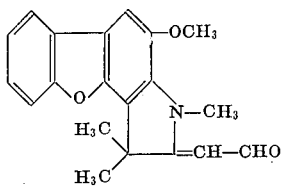

are stirred with 1.3 g of cyanoacetic acid ethyl ester in 15 ml of ethanol in the presence of 0.1 g of piperidine for 3 hours at the boil.

On cooling, 2.5 g of the dyestuff of the formula

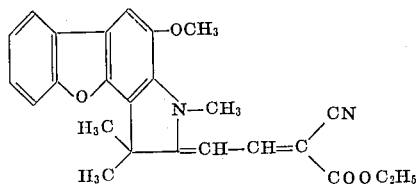

separate out.

The dyestuff dyes polyamide fabrics in a greenish-tinged yellow having good fastness properties.

The abovementioned aldehyde is obtained if the procedure indicated at the end of Example 1 is followed and instead of 3-aminodibenzofurane the equivalent amount of 2-methoxy-3-aminodibenzofurane is employed.

Single aldehydes, and hence single dyestuffs, are also obtained if the procedure indicated above is followed and in doing so 3-aminodibenzofuranes which are substituted in the position adjacent to the nitrogen are again used as the starting materials. If the following starting products are employed, dyestuffs which dye synthetic fibres in a yellow having good fastness properties are obtained: 2-bromo-3-aminodibenzofurane, 3-amino-4-methoxydibenzofurane and 2,7-dimethyl-3-aminodibenzofurane.

EXAMPLE 49

If in Example 1 2-aminodibenzofurane is employed instead of 3-aminodibenzofurane and in other respects the instructions of Example 1 are followed, a dyestuff mixture is obtained which according to the NMR spectrum consists to the extent of 74% of the angular structure

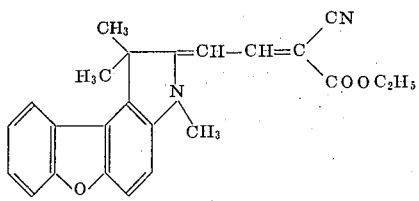

and to the extent of 26 percent of the linear component

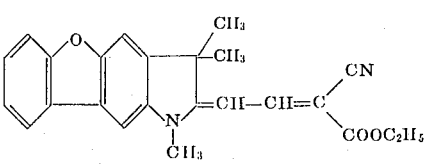

The dyestuff mixture dyes polyamide fabric in a brilliant greenish-tinged yellow.

EXAMPLE 50

A woven fabric of polyethylene terephthalate is introduced, using a liquor ratio of 1 : 40, into a dye bath at 50° which contains 0.5 g/l of the finely divided dyestuff from Example 6 and 1 g/l of a conventional anionic dispersing agent, 5 g/l of cresotic acid methyl ester and 1 g/l of NaH$_2$PO$_4$ and is adjusted to pH 4.5 – 5 acetic acid. The temperature is raised to 80° – 85° over the course of 20 minutes and the mixture is left at this temperature for 20 minutes. Thereafter the liquor is slowly brought to the boil and is then left at the boil for 1 hour. After rinsing and drying, a strongly greenish-tinged yellow dyeing of high clarity and very good fastness to light is obtained.

Similarly good effects are achieved with the remaining dyestuffs described above.

EXAMPLE 51

A knitted fabric of polyhexamethylenediamine adipate filaments is impregnated at room temperature with a solution which contains 6 parts of dyestuff from Example 43 and 7 parts of nonylphenol heptaglycol ether in 989 parts of tetrachloroethylene. After suction-draining to give a weight increase of 60 percent, the knitted fabric is dried for some minutes at 80°. Thereafter the dyestuff is fixed by heating the knitted fabric to 192° for 45 seconds. The material is then briefly washed with cold tetrachloroethylene. After drying, a very clear greenish-tinged yellow dyeing is obtained.

Similarly good effects are achieved with the remaining dyestuffs described above.

I claim:

1. Indoline dyestuff of the formula

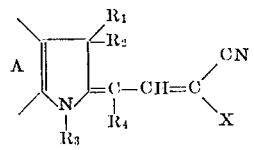

in which $R_1$ and $R_2$, independently of each other, are methyl, ethyl, cyclohexyl, phenylalkyl of 1–4 carbon atoms in the alkyl portion, or phenylalkyl of 1–4 carbon atoms in the alkyl portion wherein the phenyl portion is substituted by chloro, $C_1$-$C_4$-alkyl or $C_1$-$C_4$-alkoxy;

$R_1$ and $R_2$, when joined together are cyclopentyl or cyclohexyl;

$R_3$ is hydrogen, $C_1$-$C_6$-alkyl, $C_1$-$C_6$-alkenyl, $C_1$-$C_6$-hydroxyalkyl, $C_1$-$C_6$-hydroxyalkenyl, $C_1$-$C_6$-chloroalkyl, $C_1$-$C_6$-chloroalkenyl, $C_1$-$C_6$-bromoalkyl, $C_1$-$C_6$-bromoalkenyl, $C_1$-$C_6$-cyanoalkyl, $C_1$-$C_6$-cyanoalkenyl, $C_1$-$C_6$-alkoxy, -alkylosubstituted by $C_1$-$C_4$-alkoxy, 1-$C_6$-alkenyl substituted by $C_1$-$C_4$-alkoxy, $C_1$-$C_6$-alkylosubstituted by CONH$_2$, $C_1$-$C_6$-alkenyl substituted by CONH$_2$, $C_1$-$C_6$-alkyl substituted by $C_1$-$C_4$-alkoxycarbonyl, $C_1$-$C_6$-alkenyl substituted by $C_1$-$C_4$-alkoxycarbonyl, $C_1$-$C_6$-alkenyl substituted by $C_1$-$C_4$-alkoxycarbonyl, $C_1$-$C_6$-alkyl substituted by $C_1$-$C_4$-alkylcarbonyloxy, $C_1$-$C_6$-alkenyl substituted by $C_1$-$C_4$-alkylcarbonyloxy, cyclohexyl, naphthyl, phenyl, chlorophenyl, bromophenyl, fluorophenyl, $C_1$-$C_4$-alkylphenyl, $C_1$-$C_4$-alkoxyphenyl, phenylalkyl of 1-4 carbon atoms in the alkyl portion, or phenylalkyl of 1-4 carbon atoms in the alkyl portion wherein the phenyl portion is substituted by chloro, $C_1$-$C_4$-alkyl, or $C_1$-$C_4$-alkoxy, $R_4$ is hydrogen, $C_1$-$C_6$-alkyl, $C_1$-$C_6$-alkenyl, cyano, carbamoyl, N-($C_1$-$C_4$-alkyl) carbonyl, $C_1$-$C_4$-alkoxy-carbonyl, phenyl-($C_1$-$C_4$-alkoxy) carbonyl, substituted $C_1$-$C_6$-alkyl or substituted $C_1$-$C_6$-alkenyl wherein the substituent in said alkyl or in said alkenyl is chloro, bromo, cyano, $C_1$-$C_4$-alkoxy, CONH$_2$, $C_1$-$C_4$-alkoxycarbonyl, or $C_1$-$C_4$-alkylcarbonyloxy, A has the formula

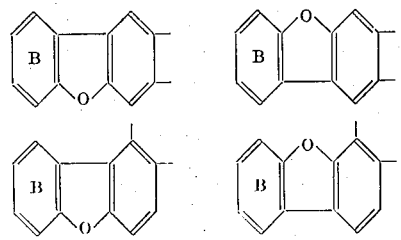

or any of said four formulas substituted by chloro, bromo, fluoro, $C_1$-$C_4$-alkyl, benzyl, $C_1$-$C_4$-alkoxy, nitro, hydroxyl, cyano, CF$_3$, $C_1$-$C_4$-alkylcarbonyl, $C_1$-$C_4$-alkoxycarbonyl, carbamoyl, N-($C_1$-$C_4$-alkyl) carbamoyl, $C_1$-$C_4$-alkylcarbonylamino, benzoylamino, toloylamino, sulphamoyl, N-($C_1$-$C_4$-alkyl) sulphamoyl, N,N-di($C_1$-$C_4$-alkyl) sulphamoyl, N,N-di($C_1$-$C_4$-alkyl) sulphamoyl, $C_1$-$C_4$-alkylsulphonyl, phenylsulphonyl, tolysulphonyl, phenoxy, tolyloxy, or benzyloxy;

and additionally, ring B may be substituted by a fused benzene ring; and

X is cyano, -CO$_2$Q, or -CONV$_1$V$_2$ where Q is $C_1$-$C_6$-alkyl, $C_1$-$C_6$-alkenyl, $C_1$-$C_6$-hydroxyalkyl, $C_1$-$C_6$-hydroxyalkenyl, $C_1$-$C_6$-alkyl substituted by $C_1$-$C_4$-alkoxy, $C_1$-$C_6$-alkenyl substituted by $C_1$-$C_4$-alkoxy, phenoxy-$C_1$-$C_6$-alkyl, phenoxy-$C_1$-$C_6$-alkenyl, cyano-$C_1$-$C_6$-alkyl, cyano-$C_1$-$C_6$-alkenyl, cyclohexyl, methylcyclohexyl, cyclopentyl, furylmethyl, thienylmethyl, phenyl-$C_1$-$C_4$-alkyl, phenyl-$C_1$-$C_4$-alkenyl, substituted phenyl-$C_1$-$C_4$-alkyl, or substituted phenyl-$C_1$-$C_4$-alkenyl wherein said substituted phenyl portions are substituted in the phenyl rings by nitro, chloro, bromo, fluoro, methoxy or methyl;

V$_1$ and V$_2$, independently of each other, are hydrogen, $C_1$-$C_6$-alkyl, $C_1$-$C_6$-alkenyl, $C_1$-$C_6$-hydroxyalkyl, $C_1$-$C_6$-hydroxyalkenyl, $C_1$-$C_6$-alkyl substituted by $C_1$-$C_4$-alkoxy, $C_1$-$C_6$-alkenyl substituted by $C_1$-$C_4$-alkoxy, phenoxy-$C_1$-$C_6$-alkyl, phenoxy-$C_1$-$C_6$-alkenyl, cyano-$C_1$-$C_6$-alkyl, cyano-$C_1$-$C_6$-alkenyl, cyclohexyl, methylcyclohexyl, cyclopentyl, phenyl-$C_1$-$C_4$-alkyl, phenyl-$C_1$-$C_4$-alkenyl, substituted phenyl-$C_1$-$C_4$-alkyl, or substituted phenyl-$C_1$-$C_4$-alkenyl wherein said substituted phenyl portions are substituted on the phenyl ring by nitro, chloro, bromo, fluoro, methoxy or methyl; and V$_1$ and V$_2$, when joined together with the N-atom, are morpholino, piperidino, N-methylpiperazino, thiomorpholino, or thiomorpholino dioxide.

2. Indoline dyestuff of claim 1 of the formula

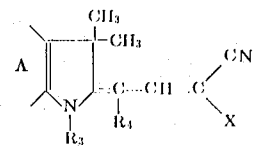

wherein
R₃ is methyl, ethyl, n-propyl, i-propyl, n-butyl, (β-chloroethyl, (β-hydroxyethyl, β-cyanoethyl, β-methoxyethyl, β-bromoethyl; β-acetoxyethyl, or benzyl;

R₄ is hydrogen or cyano;

X is cyano, C₁-C₄-alkoxycarbonyl, methoxy (C₁-C₄-alkoxy) carbonyl, cyclohexoxycarbonyl, methylchclohexoxycarbonyl, cyclopentoxycarbonyl, methylphenyl (C₁-C₄-alkoxy) carbonyl, nitrophenyl (C₁-C₄-alkoxy) -carbonyl, methoxyphenyl (C₁-C₄-alkoxy) carbonyl, chlorophenyl (C₁-C₄-alkoxy) carbonyl, and A is a dibenzofuranyl radical which is unsubstituted or is substituted by chloro, bromo, nitro, or methyl.

3. Indoline dyestuff of the formula

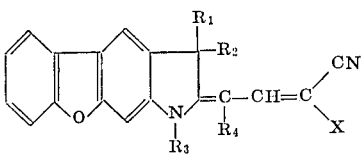

in which
R₁, R₂, R₃, R₄ and X have the same meanings as in claim 1 and the dibenzofurene radical is unsubstituted or substituted by chloro, bromo, nitro, or methyl.

4. Indoline dyestuff of the formula

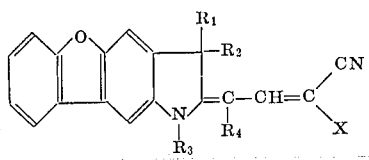

in which
R₁, R₂, R₃, R₄, and X have the same meanings as in claim 1 and the dibenzofurene radical is unsubstituted or substituted by chloro, bromo, nitro, or methyl.

5. Indoline dyestuff of the formula

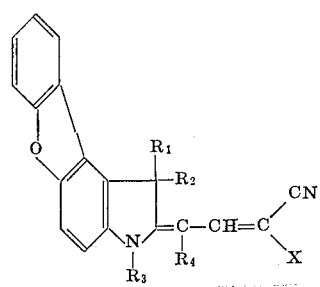

in which
R₁, R₂, R₃, R₄, and X have the same meanings as in claim 1 and the dibenzofurene radical is unsubstituted or substituted by chloro, bromo, nitro, or methyl.

6. Indoline dyestuff of the formula

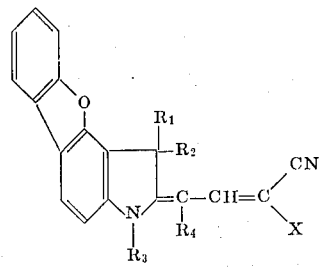

in which
R₁, R₂, R₃, R₄, and X have the same meanings as in claim 1 and the dibenzofurene radical is unsubstituted or substituted by chloro, bromo, nitro, or methyl.

7. Indoline dyestuff of the formula

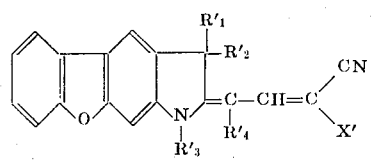

in which
R₁' and R₂' denote methyl,

R₃' denotes methyl, ethyl, n-propyl, i-propyl, n-butyl, β-chloroethyl, β-hydroxyethyl, β-cyanoethyl, β-methoxy-ethyl, β-bromoethyl, β-acetoxyethyl or benzyl, R₄' denotes hydrogen or cyano and X' represents cyano, C₁-C₄-alkoxycarbonyl, methoxy (C₁-C₄-alkoxy) carbonyl, cyclohexoxycarbonyl, methylcyclohexoxycarbonyl, cyclopentoxycarbonyl, methyl = phenyl (C₁-C₄-alkoxy) carbonyl, nitro =phenyl (C₁-C₄-alkoxy) carbonyl, methoxy = phenyl (C₁-C₄-alkoxy) carbonyl, chloro phenyl (C₁-C₄-alkoxy) carbonyl, or phenoxy (C₁-C₄-alkoxy) carbonyl.

8. Indoline dyestuff of the formula

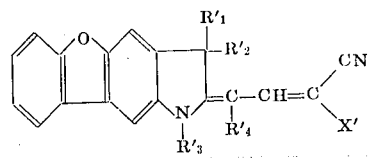

in which
R₁' - R₄' and X' have the meaning mentioned in claim 7.

9. Indoline dyestuff of the formula
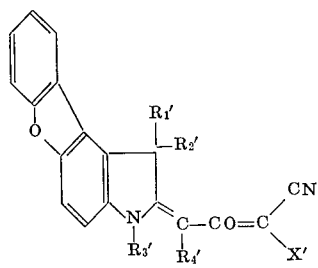
in which
R$_1$' - R$_4$' and X' have the meaning mentioned in claim 7.
10. Indoline dyestuff of the formula
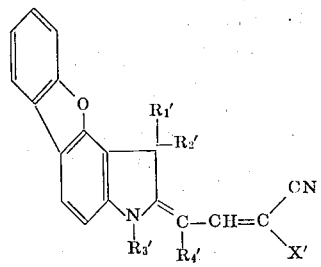
in which
R$_1$' - R$_4$' and X' have the meaning mentioned in claim 7.
* * * * *